May 20, 1958  R. E. P. MIERS  2,835,280
APPARATUS FOR ASSEMBLING SPRING UPHOLSTERY UNITS
Filed Feb. 10, 1954  4 Sheets-Sheet 1

Richard Eustace Probyn Miers
INVENTOR

May 20, 1958 R. E. P. MIERS 2,835,280
APPARATUS FOR ASSEMBLING SPRING UPHOLSTERY UNITS
Filed Feb. 10, 1954 4 Sheets-Sheet 3

Richard Eustace Probyn Miers
INVENTOR
By Richardson, Davidow Norden
his ATTYS.

May 20, 1958 R. E. P. MIERS 2,835,280
APPARATUS FOR ASSEMBLING SPRING UPHOLSTERY UNITS
Filed Feb. 10, 1954 4 Sheets-Sheet 4
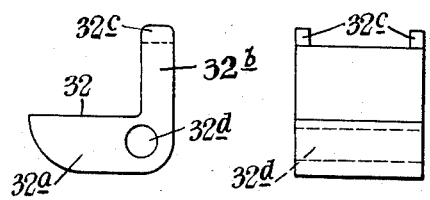
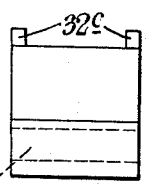
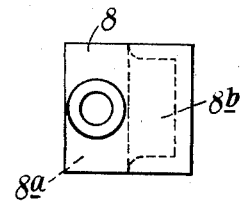
FIG.7.  FIG.8.  FIG.10.
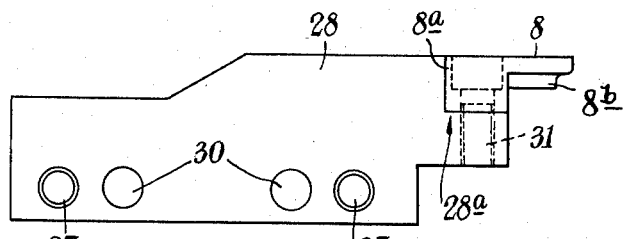
FIG.9.
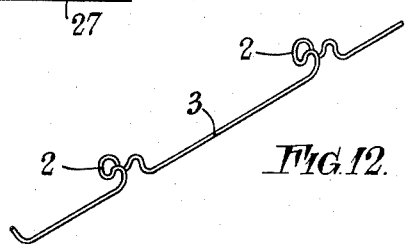
FIG.12.
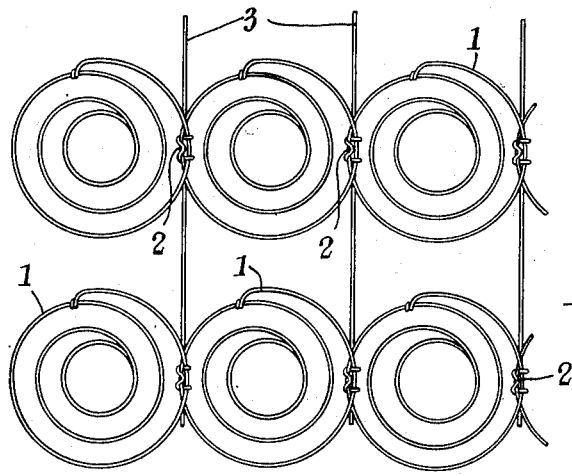
FIG.11.
Richard Eustace Robyn Miers
INVENTOR
By Richardson, David and Nordon
his ATTYS.

United States Patent Office 2,835,280
Patented May 20, 1958

2,835,280

APPARATUS FOR ASSEMBLING SPRING UPHOLSTERY UNITS

Richard Eustace Probyn Miers, London, England, assignor to Pullman (Patent) Products Limited, London, England Application February 10, 1954, Serial No. 409,468

Claims priority, application Great Britain February 16, 1953

6 Claims. (Cl. 140—3)

This invention relates to apparatus for assembling spring interiors for mattresses, cushions and the like, in which the assemblies comprise each a plurality of helical or hour-glass furniture springs arranged in rows the successive rows being connected together by the tie wires embodying deformable hook-like parts or clips capable of being engaged with end convolutions of the springs so that in the direction transverse to the directions of the tie wires the springs can be coupled together in lines. Preferably the said clips are integral deformations in the tie wires, deformations suitable for this purpose being the substantially S-shaped deformations in tie wires forming the subject of Patent No. 2,197,131 in which the S-shaped deformations equidistantly spaced along each length of the wire and disposed unilaterally of the wire are adapted each to pass sinuously over and under the slightly overlapping substantially co-planar end convolutions of a pair of springs, the deformations thereafter being clinched closely on to the springs.

Apparatus for clinching the clip formations of the tie wires onto the spring ends have been proposed heretofore, but has involved the operation of assembling the springs in a line, looping the tie wire deformations thereon, locating the tie wires interengaged with the spring ends in a line of power actuated clinching devices, bringing these devices into operation, e. g. by actuation of a foot pedal, and thereafter pushing the partial assembly of tie wires and springs along the table and repeating the cycle of operations all of which are effected manually. Frequently the operator omits to register properly the clip deformations on the tie wires with the springs and this involves the attendance of a second operator to remedy the "missed" joints by means of a single portable power operated clinching tool. The object of the present invention is to reduce the number of manual operations and to obviate, or minimise, the risk of missing properly effected joints between the tie wires and the springs.

According to the present invention apparatus for assembling spring interiors each comprising a plurality of lines of helical or hour-glass coiled springs connected together in successive rows by tie wires each having hook-like projections or clips clinched to end convolutions of the springs so that for each said projection or clip two springs of successive rows are coupled together, comprises clinching and feeding mechanisms arranged in a line and corresponding in number to the number of springs in a line of springs of the assembly or the number of hook-like projections or clips in a tie wire, supporting means for the work operated upon by the mechanisms and along which the work is fed from the mechanisms, a pair of clinching jaws with each mechanism between which at each clinching operation a pair of spring ends and the associated hook-like projection of the appropriate tie wire are pinched to clinch the tie wire to the said spring ends, means mechanically feeding the work to the clinching relationship with said jaws, and means displacing the clinched work from the clinching positional relationship with said jaws in advance of feeding a further tie wire and the next in succession line of sprngs to clinching relationship with said jaws so that the clinched work is carried away from the jaws as the unclinched work is being fed to the clinching positional relationship with said jaws.

Further, in accordance with the present invention, a mechanism including a pair of pincher jaws for clinching hook-like projections of tie wires to end convolutions of furniture springs of a spring interior for a mattress or the like, is characterised by means actuated by the movement of one of the jaws away from the other to disengage the clinched work away from clinching positional relationship with the jaws, and to displace the clinched work clear of the jaws in a direction substantially normal to the direction in which it was fed to the clinching position, the maximum separation of the jaws being greater than the diameter of a spring end convolution and the said jaw actuating said work disengaging means as it nears its terminal position remote from the other jaw passing freely across the next tie wire and associated spring ends to be clinched and upon its return movement picking up the unclinched work and carrying it towards the other jaw to clinch such work.

In order that the invention may be clearly understood and readily carried into effect drawings are appended hereto illustrating an embodiment thereof, and wherein, Figure 1 is a somewhat diagrammatic sectional side elevation view showing an arrangement of clinched work supporting table and clinching mechanisms adapted to clinch simultaneously upper and lower tie wires to the upper and lower end convolutions of successive lines of springs.

Figure 7 is a side elevation of the work ejector.

Figure 8 is a front elevation of Figure 7.

Figure 9 is a side elevation view of the fixed jaw and the support therefor.

Figure 10 is a plan view of the fixed jaw per se.

Figure 11 is a plan view of part of a finished spring assembly, and

Figure 12 is a perspective view of part of a tie wire.

Referring first to Figures 11 and 12 it will be seen that the spring assembly to be produced is shown by way of example as of the well known type comprising a number of lines of furniture springs 1 the upper and lower end convolutions of which are interengaged by the S-shaped hooks 2 of tie wires 3 clinched to the slightly overlapping ends of the springs as described in Patent No. 2,197,131. However, it will be understood that provided the tie wires are adapted to inter-engage by hook like projections with closely related end convolutions of successive lines of springs, other forms of clinched connections can be employed with the present invention.

Figure 1:
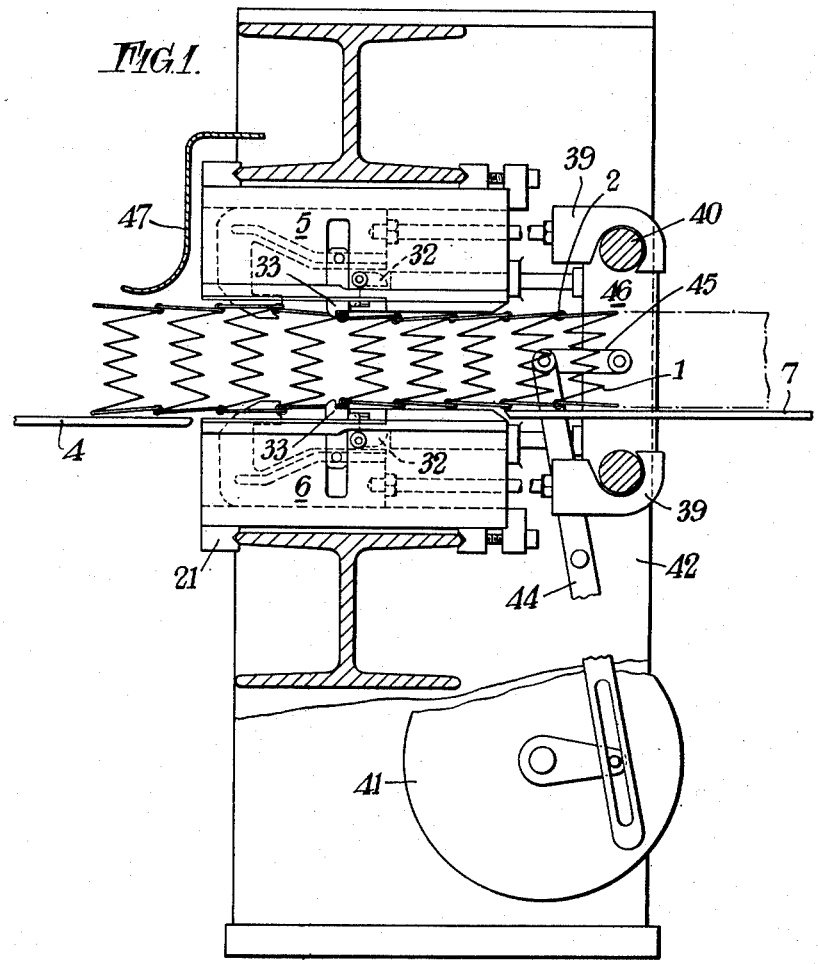
Figure 2:
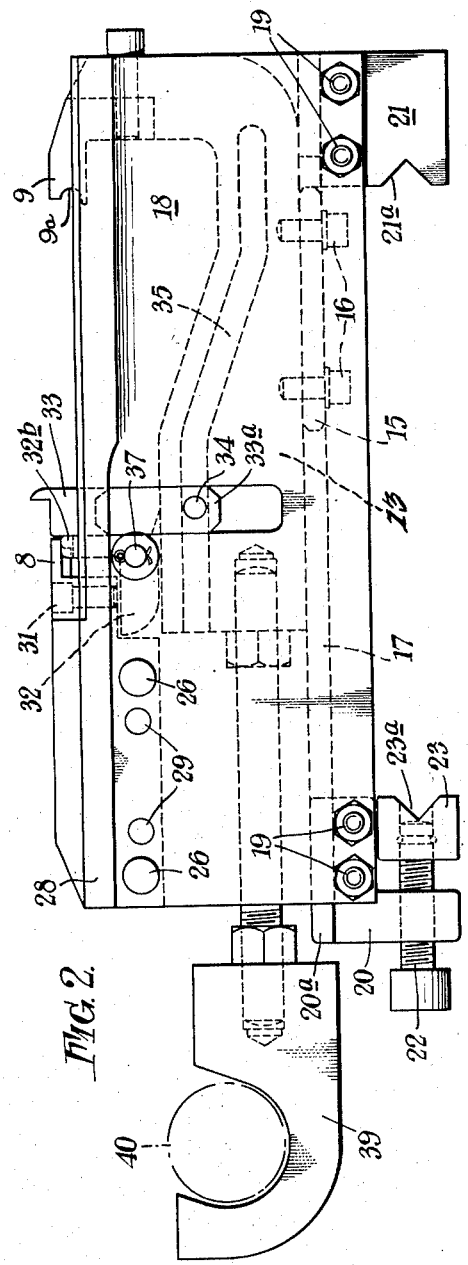
Figure 2 is a side elevation view of one of the clinching mechanisms looking from the reverse side to Figure 1.

Referring to Figures 1 and 2 the work comprising a succession of lines of helical springs with the hooks 2 of the tie wires loosely interlooped with the end convolutions of the springs is fed along a table 4 to upper and lower rows of clinching mechanisms 5 and 6 respectively so that simultaneously both an upper and a lower tie wire are clinched simultaneously to the upper and lower convolutions of two successive lines of the springs.

Following a clinching operation the work is carried forwards on to the table 7 this being effected by the clinching mechanisms as hereinafter explained so that any reasonable number of lines of springs can be assembled and the work progressively fed about the table 7.

Figure 3:
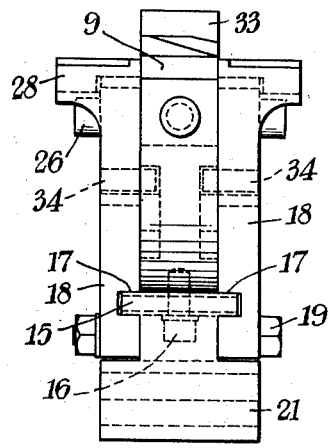
Figure 3 is a front elevation or work receiving end view of Figure 2.
Figure 4:
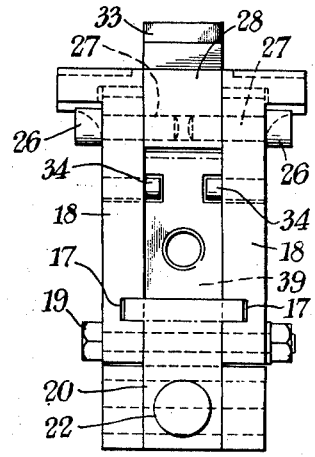
Figure 4 is a rear end view of Figure 2.
Figure 5:
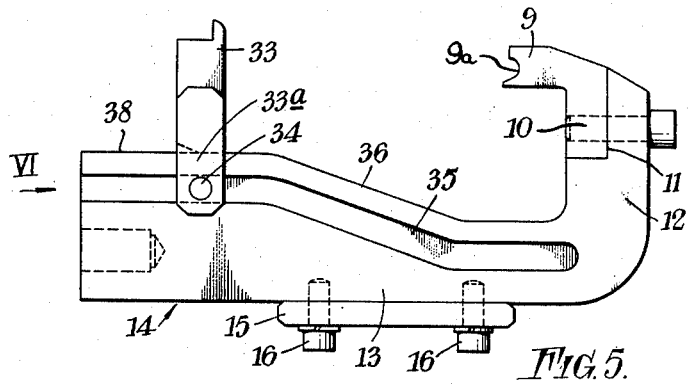
Figure 5 is a side elevation of the sliding jaw showing a vertically reciprocated work freeing plunger in position thereon.
Figure 6:
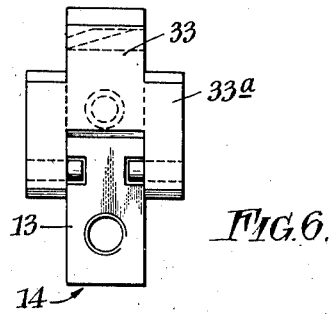
Figure 6 is an end elevation of Figure 5 looking in the direction of the arrow VI.

Considering a single clinching mechanism as shown in Figures 3 to 11 inclusive, this includes a fixed jaw 8 and a reciprocating jaw 9 between which are pinched the slightly overlapping pair of spring end convolutions, i. e. the lower convolutions with the clinching mechanism arranged as shown in Figure 3, the sliding jaw 9 being secured detachably by a vertically cranked depending limb 10 in a step 11 (see Figure 5) of the upwardly cranked free end 12 of a horizontal cam bar 13 having a machined flat base 14 which carries a slide plate 15 secured by screws 16 and sliding along a pair of horizontal channels 17 in a parallel pair of side plates 18 secured by two pairs of bolts 19 to end blocks 20 and 21, the block 20 being a rectangular angle member the horizontal limb of which receives the bolts and has a flanged upper part 20a which mates with the channels 17, whilst the vertical limb has threaded therethrough a screw 22 engaging at its unthreaded free end in a block 23 having a V notch 23a opposed to a like notch 21a of the block 21 so that the members 21 and 23 comprising clamp jaws for securing the mechanism to a cross beam of the apparatus.

At the work discharge end of the mechanism the two side plates 18 are secured by screws 26 passed through holes in the side plates into registering holes 27 in a bar 28 (see Figures 2, 3 and 9) comprising the support for the fixed jaw 8, dowels 29 also being passed through holes 27 in the side plates 18 and registering holes 30 in the support 28. The fixed jaw 8 has a rectangular rear part 8a (see Figures 9 and 10) which seats in a corresponding step 28a in the front end of the bar 28 and is secured by a countersink screw 31. Thus the jaw 8 is replaceable readily. The work is pinched between an inwardly spaced step 8b formed on the inner face of the forwardly directed part of the jaw 8 and a transversely channelled part 9a of the sliding jaw 9, and after a clinching operation the work is pushed out from under the free end of the jaw 8 by a trigger-like ejector member 32 (see Figures 2, 7 and 8) which, as shown in Figures 7 and 2, is an L-shaped member the horizontal limb 32a of which rides on the top of the cam bar 13, whilst the vertical limb 32b has two ribs 32c disposed opposite sides of the step 8b so that the limb 32b can be brought into the position shown in Figure 2 substantially co-planar with a vertically reciprocated stripper member in the form of an ejector bar 33 (see Figures 3 and 6) standing up from an integral saddle part 33a of rectangular inverted U form which straddles the bar 13 and in its furcations carries pins 34 which engage in side channels 35 of the bar 13 formed parallel with the top of such bar which includes a slope 36 which allows the limb 32a of the trigger member to pivot downwards about a pivot pin 37 passed through the side plates 18 and a pivot hole 32d in the trigger, the upper horizontal part 38 of the bar 13 riding against the trigger limb 32b to effect the displacement of the work from under the jaw 8 just in advance of the pins 34 of the ejector 33 engaging in the corresponding parts of the channels 35 as the bar 13 moves so that the clinched work is pushed on top of the ejector 33 and by continued upward movement of the ejector carried into planar alignment with the top of the bar 28 whereby the clinched work is freed to be pushed forwardly along the top of the bar 28 on to the table 7 as the new work is carried by the jaw 9 to the clinching zone.

The bars 13 of each set of clinching mechanisms carry hooks 39 by which they are connected to a common cross rod 40, the two rods 40 (see Figure 1) being actuated by any suitable mechanism, e. g. a fly wheel 41 carried by the machine frame 42 and connected by crank 43, connecting rod 44, and link 45 to one of a pair of side plates 46 across which the rods 40 are fixed, the drive if desired being duplicated the opposite side of the machine. Alternatively a hydraulic arm can actuate the side plates 46, and controlled by a foot-pedal-operated valve or a valve operated automatically in synchronism with mechanical means which can feed the lines of springs in succession into the clinching mechanism. A deflector plate 47 can be provided for guiding the springs smoothly into the mechanism.

I claim:

1. A clinching machine for use in the production of mattress and cushion spring assemblies of the type comprising a plurality of rows of helical or hour-glass coil springs connected together by tie wires each having equidistantly spaced hook-like projections inter-looped with the end convolutions of the springs and in which each tie wire is common to either the lower or the upper end convolutions of two closely related parallel lines of springs and also in which the hook-like projections are loosely interlooped with the spring ends of an assembly ready for clinching the hook-like projections comprising two opposed lines of clinching mechanisms both arranged for simultaneous operation on the said projections of an upper and a lower tie wire and spaced apart to receive the spring assembly between them, one mechanism being for the tops of the springs and the associated tie wires and the other for the bottoms of the springs and associated tie wires, a support for the loose assembly of springs and tie wires to be operated upon by the said mechanisms and along which support the loose assembly is displaced into said mechanisms, the number of mechanisms for each line corresponding to the number of springs in each row, a fixed jaw and a reciprocating jaw for each said mechanism between which the appropriate hook-like projection and pair of spring end convolutions interlooped by the projection are pinched to clinch the projection onto the spring ends, power actuated means actuating said reciprocating jaws in unison to impart a stroke thereto which at the terminal position of the reciprocating jaws remote from the fixed jaws brings such reciprocating jaws immediately behind the loosely inter-engaged tie wires and the two lines of springs to have the associated tie wires clinched thereto, a first ejector with each said fixed jaw to engage and eject the clinched work from the fixed jaw, means to actuate said first ejector in the work ejecting direction, means synchronising the ejection action with the initial separation of the reciprocating and fixed jaws, a second ejector member on to which the clinched work is delivered by the first ejector, and means to displace said second ejector transversely relatively to the plane of movement of the reciprocating jaw to free the clinched work from the fixed jaw.

2. Apparatus according to claim 1, wherein each said second ejector member comprises a work stripper bar slidably guided close to the work receiving part of the fixed jaw for movement transverse to the plane of movement of the reciprocating jaw, a cam member moving in unison with said reciprocating jaw and via its cam operating said stripper bar in timed relationship with the opening and closing of the jaws so that the bar is displaced across the front or work receiving part of the fixed jaw to move the clinched work away from the fixed jaw during sliding of said reciprocating jaw between successive work feeding and clinching operations, each fixed jaw being recessed to engage over the work, said first ejector member having a first part disposed in the recessed part of the fixed jaw and opposed to the slidable jaw and a second part operatively engaged by the cam member to actuate such first part towards the work receiving or free end of the fixed jaw to disengage the clinched work from under the fixed jaw and push it on to said stripper bar in advance of the completion of the work displacing movement of the stripper bar.

3. In a machine for clinching together lines of helical furniture springs and tie wires each with a number of sinuous hook-like projections loosely interlooped individually with the end convolutions of two closely related furniture springs, a number of clinching mechanisms corresponding to the number of said hook-like projections in a single tie wire, a support along which the loose assembly of springs and tie wires is fed to the mechanisms, a fixed jaw and a reciprocating jaw with each said mechanism between which the appropriate hook-like projection and pair of spring end convolutions loosely interlooped by the projection are pinched to clinch the projection onto the spring ends, a slidable member with each mechanism carrying the associated reciprocating jaw, power actuated means actuating said slidable members in unison to impart a stroke to the reciprocating jaws not less than the spacing of successive tie wires so that at the terminal position of the reciprocating jaws remote from the fixed jaws the reciprocating jaws are positioned for forward pinching engagement immediately behind the tie wires to be clinched to two lines of springs, a first ejector with each said fixed jaw to engage and eject the clinched work from the fixed jaw, a lost motion driving connection between said slidable members and said first ejectors to actuate said first ejector in the work ejecting direction during separation of the reciprocating and fixed jaws, a second ejector member with each said mechanism located close to the first ejector member and on to which the clinched work is pushed by the first ejector out of the fixed jaw and a driving connection between said slidable members and said second ejector members displacing the second ejector members from an idle position clear of the jaws when the reciprocating jaws are moving towards the fixed jaws and to the work receiving and stripping position upon reversal of movement of the reciprocating jaws.

4. In mechanism for clinching hook-like projections of tie wires to furniture springs a fixed jaw and a reciprocating jaw between which the hook-like projections and spring end convolutions are pinched, means to drive the reciprocating jaw, a work guide along which the work is pushed towards the fixed jaw by the reciprocating jaw to clinch the work when the jaws meet, work stripping means with the fixed jaw comprising an ejector member to engage the work but yieldable in one direction to the displacement of the work relatively to the fixed jaw as the reciprocating jaw meets the fixed jaw, means to displace positively said ejector member in the reverse direction upon separation of the jaws to displace the clinched work in the direction of concurrent movement of the reciprocating jaw, a second ejector member adapted to engage and then strip the clinched work away from said first ejector member and fixed jaw to a plane where it is free to slide forwards clear of the fixed jaw upon movement of the reciprocating jaw towards the fixed jaw and during a first stage of such latter jaw movement to be held stationary and during the remainder of such latter jaw movement to be displaced out of the path of the reciprocating jaw, and means to impart said movements to said second ejector member in the said timed relationship with the reciprocating jaw.

5. In mechanism for clinching hook-like projections of tie wires to furniture springs a fixed jaw and a reciprocating jaw between which the hook-like projections and spring end convolutions are pinched, means to drive the reciprocating jaw, a work guide along which the work is pushed towards the fixed jaw by the reciprocating jaw to clinch the work when the jaws meet, work stripping means with the fixed jaw comprising an ejector member to engage the work but yieldable in one direction to the displacement of the work relatively to the fixed jaw as the reciprocating jaw meets the fixed jaw, means to displace positively said ejector member in the reverse direction upon separation of the jaws to displace the clinched work in the direction of concurrent movement of the reciprocating jaw, a second ejector member adapted to engage and then strip the clinched work away from said first ejector member and fixed jaw to a plane where it is free to slide forwards clear of the fixed jaw upon movement of the reciprocating jaw towards the fixed jaw and during a first stage of such latter jaw movement to be held stationary and during the remainder of such latter jaw movement to be displaced out of the path of the reciprocating jaw, a guide in which the second ejector member reciprocates transversely relatively to said work guide, and a lost motion driving connection between said reciprocating jaw and said second ejector member to impart said movements to said second ejector member in the said timed relationship with the reciprocating jaw.

6. In mechanism for clinching hook-like projections of tie wires to furniture springs a fixed jaw and a reciprocating jaw between which the hook-like projections and spring end convolutions are pinched, means to drive the reciprocating jaw, a work guide along which the work is pushed towards the fixed jaw by the reciprocating jaw to clinch the work when the jaws meet, work stripping means when the fixed jaw comprising a first ejector member in the form of a two limbed trigger pivoted at the junction of its limbs with one limb displaceable as a work ejector across the fixed jaw but yieldable in one direction to the displacement of the work relatively to the fixed jaw as the reciprocating jaw meets the fixed jaw, means to displace positively said ejector member in the reverse direction upon separation of the jaws to displace the clinched work in the direction of concurrent movement of the reciprocating jaw, a second ejector member adapted to engage and then strip the clinched work away from said first ejector member and fixed jaw to a plane where it is free to slide forwards clear of the fixed jaw upon movement of the reciprocating jaw towards the fixed jaw and during a first stage of such latter jaw movement to be held stationary and during the remainder of such latter jaw movement to be displaced out of the path of the reciprocating jaw, said means to impart said positive displacement of the first ejector member and said means to impart said movements to said second ejector member comprising a lost motion driving connection between the means driving said reciprocating jaw and the said ejector members.

References Cited in the file of this patent

UNITED STATES PATENTS

| | | |
|---|---|---|
| 1,512,990 | Lehmann | Oct. 28, 1924 |
| 1,905,459 | Gail | Apr. 25, 1933 |
| 1,943,546 | Owen | Jan. 16, 1934 |
| 2,176,262 | Kirchner | Oct. 17, 1939 |
| 2,232,072 | Levine | Feb. 18, 1941 |
| 2,329,202 | Jonassen | Sept. 14, 1943 |
| 2,330,244 | Saval | Sept. 28, 1943 |
| 2,388,106 | Woller | Oct. 30, 1945 |
| 2,537,817 | Edwards | Jan. 9, 1951 |
| 2,059,117 | King | Oct. 27, 1956 |

FOREIGN PATENTS

| | | |
|---|---|---|
| 622,231 | Great Britain | Apr. 28, 1949 |